(12) United States Patent
Lochner et al.

(10) Patent No.: US 6,615,638 B1
(45) Date of Patent: Sep. 9, 2003

(54) DEVICE FOR THE GRAVIMETRIC TESTING OF MULTICHANNEL PIPETTES

(75) Inventors: Karl Heinz Lochner, Wertheim (DE); Thomas Weingärtner, Würzburg (DE); Jutta Paulus-Neues, Würzburg (DE); Viktor Leibel, Flachslanden (DE); Peter Madloch, Griesheim (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/539,398

(22) Filed: Mar. 31, 2000

(30) Foreign Application Priority Data

Oct. 12, 1999 (DE) ..................... 299 17 940 U

(51) Int. Cl.$^7$ ................................. G01N 1/14
(52) U.S. Cl. ........................................ 73/1.74
(58) Field of Search ................... 73/1.13, 1.16, 73/1.36, 1.73, 1.74, 862.541, 862.543; 177/50, 211, 210, 253, 26

(56) References Cited

U.S. PATENT DOCUMENTS

| | | | | |
|---|---|---|---|---|
| 4,354,376 A | * | 10/1982 | Greenfield et al. | .......... 73/1.74 |
| 5,061,639 A | * | 10/1991 | Lung et al. | |
| 5,640,334 A | * | 6/1997 | Freeman et al. | .............. 73/1.13 |
| 5,998,218 A | * | 12/1999 | Conley et al. | ........... 73/864.16 |

* cited by examiner

Primary Examiner—Robert Raevis
(74) Attorney, Agent, or Firm—Leydig, Voit & Mayer, Ltd.

(57) ABSTRACT

A device is described for gravimetric testing of multi-channel pipettes having two or more pipette channels. The device has one receptacle (9) per pipette for a test volume or for a container (2, 20) containing the test volume, and in addition, one weighing cell (1) per receptacle (9) for weighing of the container (2, 20) and/or of the test volume.

17 Claims, 4 Drawing Sheets

Figure 1:
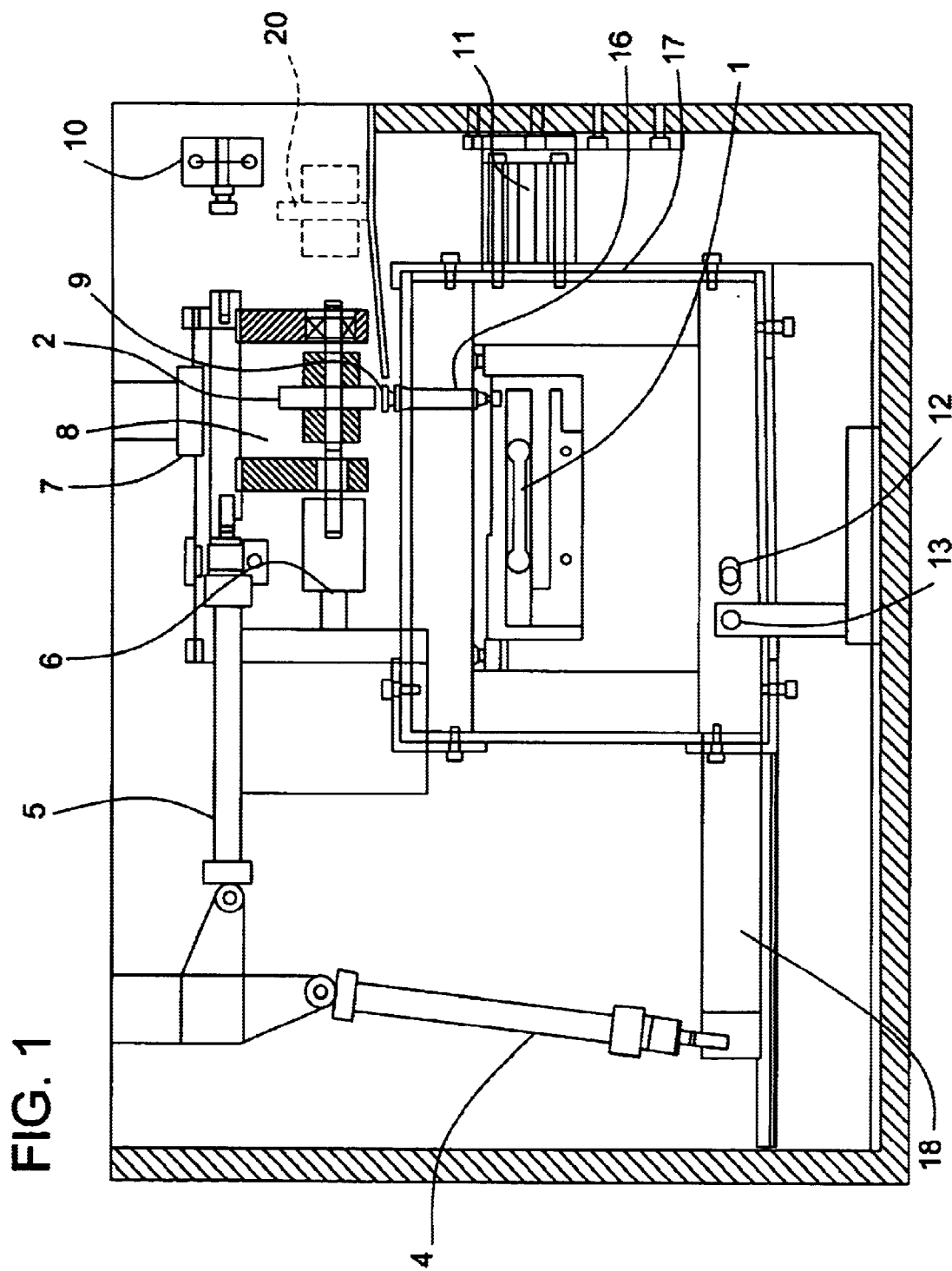

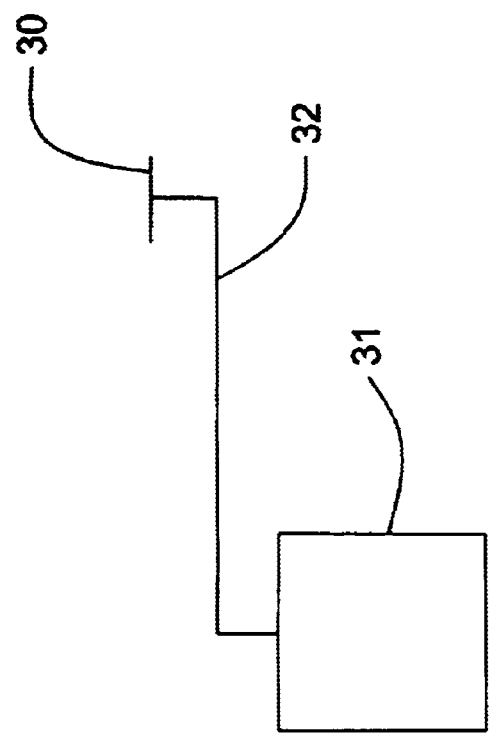
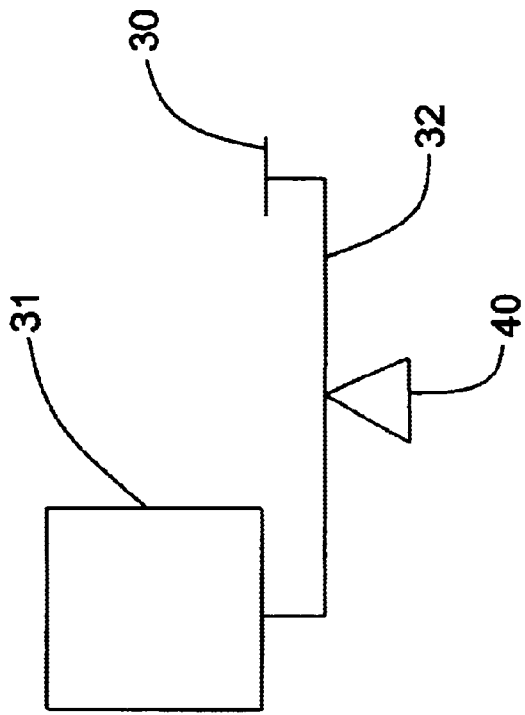

DEVICE FOR THE GRAVIMETRIC TESTING OF MULTICHANNEL PIPETTES

RELATED APPLICATIONS

This application claims the benefit of German Application Serial No.299 17 940.0, filed Oct. 12, 1999.

BACKGROUND OF THE INVENTION

The invention pertains to a device for gravimetric testing of multi-channel pipettes which have two or more pipette channels.

Multi-channel pipettes are frequently used in laboratories, particularly in biosciences and medicine. One important advantage of multi-channel pipettes, which as a rule consist of 4, 8 or 12 channels, is that fewer pipetting processes are required. This makes possible significantly faster and more efficient working.

One embodiment form of multi-channel pipettes uses piston-stroke pipettes with air cushions, which allows the transfer of quantities of liquid in the $\mu L$ range. The replaceable plastic tip and the air cushion make possible to prevent contamination of the pipette, e.g., by radioactive or infectious material, in this kind of piston stroke pipette.

Manufacturers of multi-channel pipettes must establish proof of their measurement accuracy with conformance certification. In addition, certified laboratories regularly must check the measurement accuracy of their test apparatuses according to DIN EN ISO 9000; this also pertains to their multi-channel pipettes.

When testing the measurement accuracy of multi-channel pipettes, as a rule, the procedure according to DIN 12650 is used. In gravimetric testing according to DIN 12650-6, for example, first all channels of a piston stroke pipette are equipped with tips. For pre-moistening of the air cushion in tips and pipettes, five pipetting steps with water must be carried out before beginning the test. During pipetting, care must be taken that all channels are filled in order to prevent errors due to tipping effects resulting from irregular loading of the individual channels. Next, the contents of each channel will be pipetted into a tarred weighing vessel and the pipetted water volume determined by weighing.

For each channel, ten measurements are prescribed according to DIN 12650-6. Since multi-channel piston-stroke pipettes always allow a volume adjustment, the testing must be carried out at the rated volume, half the rated volume, and also at the smallest adjustable volume. Whereas in the case of the single-channel pipettes with a fixed volume, only ten measurements are needed, for a 12-channel piston stroke pipette, a total of 360 measurements will be required. Therefore, whereas the single-channel pipette will only require a test time of about 15 to 20 min, the 12-channel piston stroke pipette will require about 10 to 12 hs.

This large time requirement for conventional test methods for multi-channel pipettes shows the significant disadvantage of these test methods. Also, the evaluation of conventional test methods takes long time.

Proceeding from these disadvantages of the state of the art, the invention is based on the problem of specifying a device which allows the essentially automatic testing of a multi-channel pipette and which reduces the time necessary for the testing. In addition, the device should allow an automatic evaluation of the test results.

This problem is solved by the main patent claim. The subordinate claims pertain to favorable embodiments and refinements of the invention.

A device is proposed for gravimetric testing of multi-channel pipettes which have two or more pipette channels, with one receptacle per pipette for a test volume or for a container containing the test volume, and one weighing cell per receptacle for weighing the container and/or the test volume. In addition, for each receptacle the device features one weighing cell for weighing the container or the test volume, or for simultaneous weighing of container and test volume.

With a device of this kind, it is possible to reduce significance the time required for the testing of multi-channel pipettes because a parallel measurement and evaluation of the individual pipette channels can occur. Thus, according to the present invention, both the pipetting and the weighing for all pipette channels of a multi-channel pipette can be conducted simultaneously. In addition, when using the device according to the present invention, it is possible to implement a fully automatic evaluation of the weighing results. For complete testing of a 12-channel pipette and evaluation of the measured results, the test time can thus be reduced significantly.

The test volume dosed through one pipette channel can be pipetted either directly into a correspondingly formed receptacle, or into a separate container which is held in the receptacle for measurement. Each receptacle, in turn, can rest directly upon the weighing cell assigned to the receptacle, or it can be connected via a linkage or a lever arrangement to the weighing cell. The particular configuration of the connection between receptacle and weighing cell depends in particular on the kind of weighing cell used. Due to a suitable selection of the type of weighing cell and of the connection between receptacle and weighing cell, the device according to the present invention can be used for the testing of a number of different commercially available multi-channel pipettes.

Figure 2:
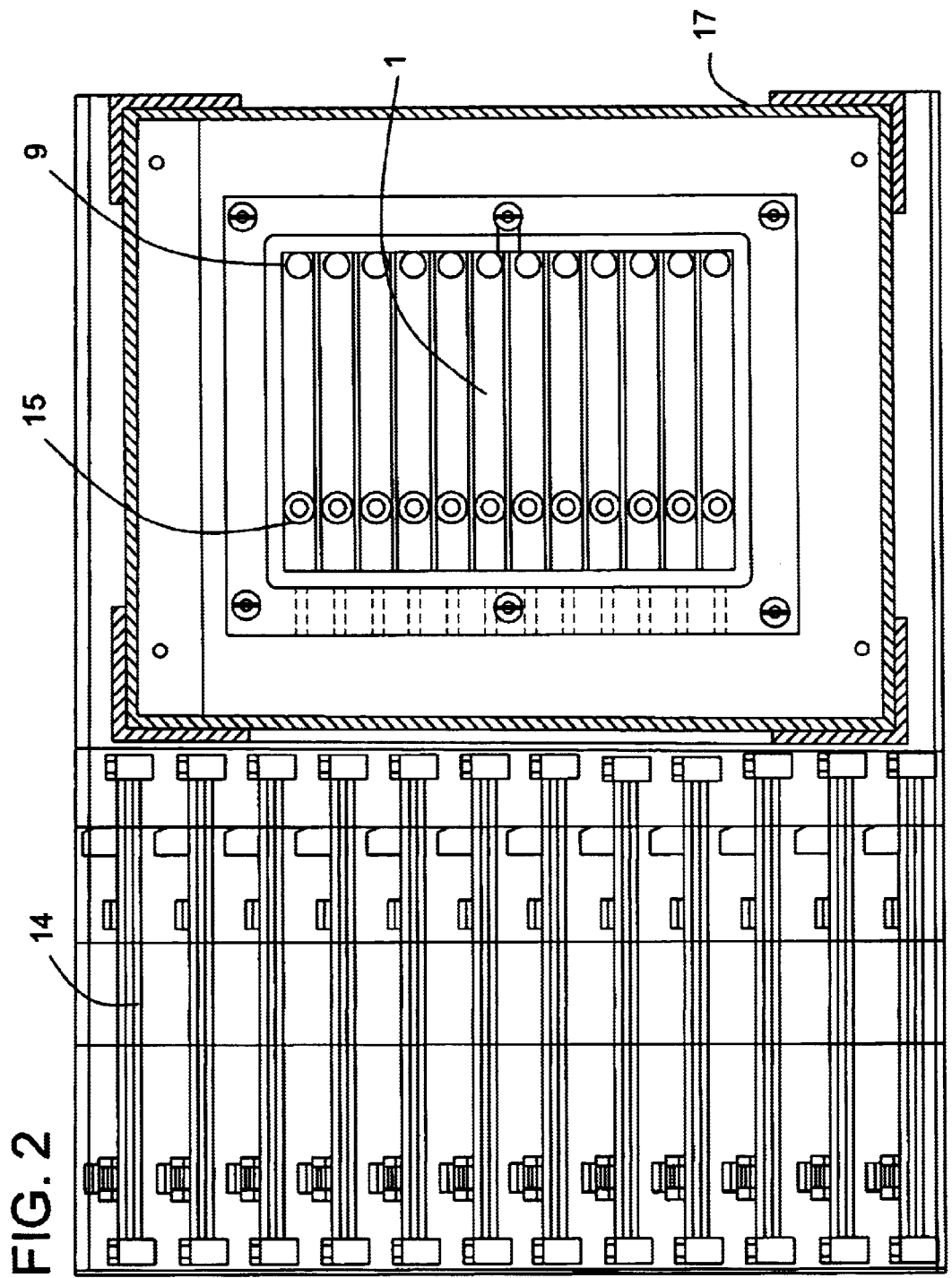
Figure 3:
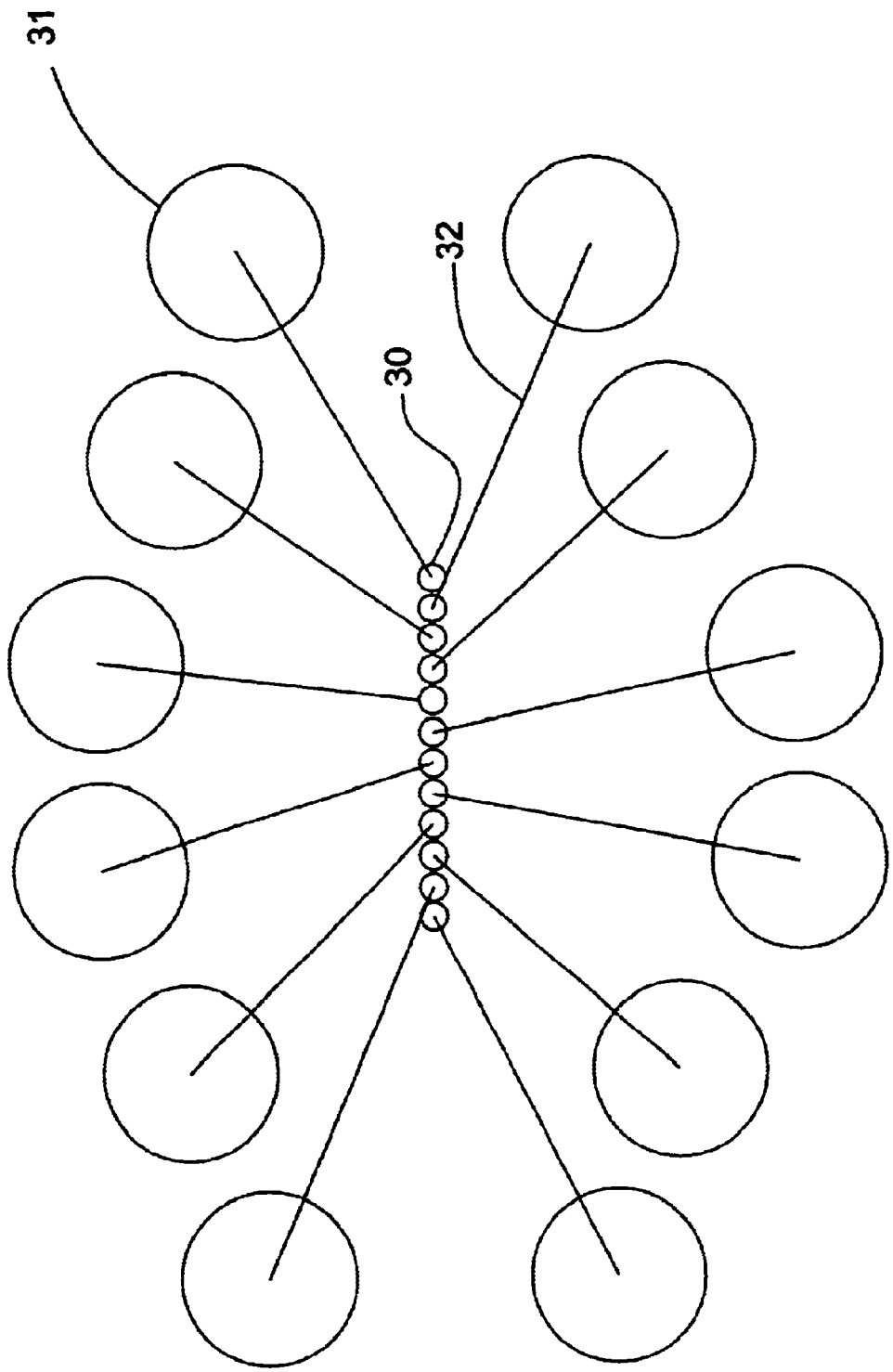

Additional advantages and forms of the invention are indicated in the embodiment examples and the figures. Shown are:

FIG. 1, a side view of a first embodiment example of the test device according to the present invention;

FIG. 2, a view of the weighing unit of the test device according to FIG. 1;

FIG. 3, the arrangement of weighing cells and receptacle according to a second embodiment example, and FIGS. 4 and 5, two embodiment examples of the connection between receptacle and weighing cell.

FIG. 1 shows a first embodiment example of the device according to the present invention for gravimetric testing of multi-channel pipettes with two or more pipette channels presented in a side view. The device according to FIG. 2 features twelve weighing cells 1 positioned side by side in the form of strain gauges. The assembly of weighing cells 1 are located in a housing 17, which protects the weighing cells 1 against environmental influences. The housing 17 features one tubular opening 16 per weighing cell 1 through which a rod-like element is inserted. By means of the rod-like element, each weighing cell 1 is connected to a receptacle formed as a holding plate 9. The individual weighing cells 1 are connected by attachments 15 to the housing 17. In addition, the housing 17 in FIGS. 1 and 2 has openings (not illustrated) through which each weighing cell 1 is connected to a repeater plate 14.

In the embodiment example of the test device illustrated in FIGS. 1 and 2, the spacing between neighboring weighing cells 1 is about 9 mm and thus corresponds to the spacing between neighboring pipette channels of the multi-channel pipette. In addition, the test device features a mount 8 to hold the containers 2, which, in turn, hold the test volumes.

The containers 2 are designed as glass tubes, of metal or another metal. The mount 8 is composed of two jaw-like elements, each of which features a semicircular cavity for each container 2. The jaw-like elements can be moved relative to each other by a drive unit 6. By using the drive 6, the two jaw-shaped elements of the mount 8 can be moved between a first position, in which they surround the containers 2, and a second position, in which they release the container 2. The drive unit 6 is designed as a pneumatic drive.

In turn, the drive unit 6 and the mount 8 with the two jaw-like elements can be moved by means of an additional pneumatic drive 5 between a sampling position and a weighing position. In FIG. 1 there is a mount 8 in the weighing position, i.e., the containers 2 are located above the holding plates 9. The container 20 indicates the sampling position where the containers 20 located in the mount 8 are found when they are being filled. The drive 5 is composed of a pneumatic cylinder which moves the mount 8 back and forth between the sampling position and the weighing position by means of the guide 7 and the stop 10.

Finally, the device for gravimetric testing according to the first embodiment example features yet another drive unit 4, which makes possible relative movement between mount 8 and weighing cells 1 by means of a lever device. In this case, a lever 18 is moved via the pneumatic cylinder 4 which is pivotably mounted at a position 13. This particular lever arm of the lever 18, which is located opposite the pneumatic cylinder 4, features a support 12 for rotary bearing of the housing 17. A movement of the pneumatic cylinder 4 causes the housing 17 and thus every weighing cell 1 to be moved along a parallel guide 11 in the direction of the mount 8 to and from the mount 8.

The testing of one multi-channel pipette proceeds in such a manner that by means of the pneumatic cylinder 6 the mount 8 is initially moved into the sampling position. By means of the pneumatic cylinder 5, the two jaws of the mount 8 are opened and twelve glass tubes 20 arranged side by side are moved into the region between the two jaws. Due to the pneumatic cylinder 6, the two jaws of the mount 8 are then moved toward each other, so that the jaws securely surround the glass tubes 20. By means of the multi-channel pipette to be tested, the glass tubes 20 are then filled with the sample volumes. Before the first pipetting, it is recommended to carry out the weighing process described below with the empty tube in order to predetermine the tare of the glass tubes 2, 20. The pneumatic cylinder 5 is actuated for weighing and the mount 8, as illustrated in FIG. 1, is moved into the weighing position.

After the mount 8 has been brought into the weighing position, by means of the pneumatic cylinder 5, the weighing cells 1 and the receiving plate 9 are moved in the direction of the glass tube 2 located between the jaws of the mount 8. The travel path of the receiving plate 9 during the movement of the pneumatic cylinder 4 is only a few millimeters in this case. After the movement of the receiving plate 9 in the direction of the glass tube 2, the jaws of the mount 8 are opened by means of the drive 6 and the glass tubes 2 are arranged on the receiving plates 9. The individual glass tubes 2 are then weighed with the test volumes enclosed therein. The results of the weighing process are handled under computer control. At the conclusion of the weighing process, the two jaws of the mount 8 are again moved via the pneumatic drive 6 back in the direction of the glass tubes 2, in order to surround them securely. Next, via the pneumatic cylinder 4, the housing 17 is moved downward with the weighing cells 1 and the receiving plates 9. The glass tubes 2 are then moved via the pneumatic drive 5, from the weighing position back into the sampling position. In that position, the jaws of the mount 8 are opened and the test tubes are removed. Next, new test tubes can be placed between the jaws and the aforementioned process can be repeated. Alternatively, if the glass tubes 2, 20 are of sufficient volume, it is also possible to pipette again into the same glass tubes which already contain test volumes from the previous pipetting process.

According to the first embodiment example, pneumatic cylinders are used as the drive for the jaws of the mount 8, the mount 8 itself, and also for the weighing cells 1. Alternatively or in addition this pneumatic arrangement, stepper motors, servomotors and/or other motors may be used. In addition, it is possible to design the mount 8 as an arm, and at the one end of the arm there are the two jaws to hold the tube and at its other end there are suspension-mounted calibrating weights. The arm should have sufficient length that the calibrating weights will be in the weighing position, i.e., above the receiving plate 9, when the jaws enclosing the glass tubes are located in the sampling position. In this manner it is possible, during the pipetting process, to move the weighing cells 1 with the receiving plates 9 in the direction of the calibrating weights in order to calibrate the weighing cells 1.

Preferably the glass tubes 2, 20 have an upwardly tapered opening in order to reduce the measuring error caused by evaporation. This kind of configuration of the glass tubes 2, 20 is useful primarily when testing volumes less than 10 $\mu$L. In the case of larger volumes, cylindrical tubes 2, 20 without tapered openings are useful in order to alleviate stripping of the pipette tips.

In addition, the device can also have sensors for the measuring of parameters relevant to the determination of the sample volumes. For example, it is possible to provide the device with an air pressure sensor and/or an air temperature sensor and/or a test liquid temperature sensor. In the calculation of the test volumes, the weighed values of the weighing cells 1 must also be subjected to an air buoyancy correction. The air pressure and air temperature data required for this air buoyancy correction can be obtained fully automatically by a computer and used for automatic calculation of the test mass. Then by automatic means, the density can be determined from the test liquid temperature by means of a polynomial or via a table. From the mass and the density of the test liquid, in turn, the volume is obtained. Then subsequent to the testing, the computer can prepare and print out a complete test record.

FIG. 3 shows an additional embodiment example of an arrangement of the weighing cells 31 and of the receiving plate 30 according to the present invention. In practice, it turns out that indeed weighing cells with a strain gauge, like those illustrated in FIG. 2, can be positioned closely side by side. However, when using other weighing principles, which can also be used in conjunction with the present invention, the configuration indicated in FIG. 2 cannot be implemented. For example, weighing cells that operate using the principle of electromagnetic force compensation usually have a diameter of a few centimeters. If the receptacles 30 were placed directly upon the weighing cells 31, then this would mean that the spacing between neighboring weighing cells and neighboring receptacles would be greater than the spacing between neighboring pipetting channels of the multi-channel pipette. And thus, parallel pipetting into a number of vessels or receptacles 30 would be rendered impossible.

For this reason, as illustrated in FIG. 3, it is proposed that the receptacles 30 be placed at a distance from the pipetting channels and that the weighing cells 31 be positioned horizontally at a distance from the associated receptacles 30 and connected to the receptacles 30 via linkages 32 or via lever arrangements 32, 40 (see FIGS. 4 and 5). According to this embodiment example, neighboring linkages 32 or lever arrangements 32, 40 form an angle of >0°—as seen from the associated receptacles 30. This means that the linkages 32 or the lever arrangements 32, 40 are not parallel to each other. Due to this kind of fanned-out distribution of the linkage 32 or of the lever arrangements 32, 40, weighing cells 31 whose diameter is greater than the spacing of neighboring pipette channels can be used for parallel determination of test volumes. Instead of or in addition to the horizontal fanned-out arrangement, a vertical fanned-out arrangement is also possible. This means that the weighing cells 31 and the linkages 32 or lever arrangements 32, 40 are then positioned at different heights. In this case, the linkages 32 can also run parallel to each other.

As indicated in FIG. 4, the linkage 32 presented in FIG. 3 can be seated on a bearing 40. The force exerted onto the weighing plate 30 is thus transferred via a lever arrangement 32, 40 to the weighing cell 31. In the embodiment example shown in FIG. 5, the weight acting on the receiving plate 30 is transferred directly via the linkage 32 to the weighing cell 31.

A weighing arrangement according to FIGS. 3, 4 and 5 can replace the weighing arrangement indicated in FIGS. 1 and 2 within the housing 17. In this case, any major modifications in addition to the housing 17 are not necessary for the test embodiment illustrated in FIGS. 1 and 2.

Preferably, the device will also include a computer to control the gravimetric testing as well as to evaluate the sensor data and the determined weighing results.

We claim:

1. A device for gravimetric testing of multi-channel pipettes comprising two or more pipette channels, with one receptacle per pipette for a test volume or for a container containing the test volume, and one weighing cell operating according to the principle of electromagnetic force compensation per receptacle for weighing of the container and/or of the test volume, wherein each receptacle is connected to the associated weighing cell by a linkage or lever arrangement.

2. A device according to claim 1, wherein neighboring linkages or lever arrangements are arranged circumferentially around and with respect to the receptacles.

3. A device according to claim 1, wherein the spacing of neighboring weighing cells is equal to the spacing of neighboring pipette channels of the multi-channel pipette.

4. A device according to claim 1, wherein the spacing of neighboring weighing cells is greater than the spacing of neighboring pipette channels of the multi-channel pipette.

5. A device according to claim 1, wherein the device has a mount for the containers.

6. A device according to claim 5, wherein the mount has two jaws and the jaws can move between a position in which they surround the container and a position in which they release the container.

7. A device according to claim 5, wherein the weighing cells and the mount can move relative to each other.

8. A device according to claim 5, wherein a mount can move between a sampling position and a weighing position.

9. A device according to claim 8, wherein the device is composed of at least one pneumatic arrangement and/or at least one stepper motor and/or at least one servomotor as drive unit for the mount and/or the jaws of the mount and/or the weighing cells.

10. A device according to claim 8, wherein the mount is located at the end of an arm which has at its other end a receptacle for slide-mounted calibration weights, where the arm is designed such that the calibration weights are located in the weighing position when the mount is in the sampling position.

11. A device according to claim 1, wherein the weighing cells are surrounded by a separate housing.

12. A device according to claim 11, wherein the housing has a lead hole for each receptacle into which a linkage can be inserted which connects the weighing cells to the associated reservoirs.

13. A device according to claim 1, wherein the device has at least one sensor to measure at least one parameter relevant for determination of the sample volume.

14. A device according to claim 13, wherein an air pressure sensor and/or a test liquid temperature-sensor and/or an air temperature sensor are provided.

15. A device according to claim 1, wherein the device has a computer to control gravimetric testing and/or to evaluate sensor data and/or to evaluate test results.

16. A device according to claim 1, wherein the containers are tapered down to the container opening.

17. A device according to claim 1, wherein one linkage or lever arrangement is arranged at different vertical height than the neighboring linkage or lever arrangement at the locations where the linkages or lever arrangements connect with the weighing elements.

* * * * *